United States Patent [19]

Behrens et al.

[11] Patent Number: 4,779,585

[45] Date of Patent: Oct. 25, 1988

[54] HYDRAULIC-DAMPING ENGINE MOUNT

[75] Inventors: Stefan Behrens, Höhr-Grenzhausen; Manfred Hofmann, Hünfelden, both of Fed. Rep. of Germany

[73] Assignee: Metzeler Kautschuk GmbH, Munich, Fed. Rep. of Germany

[21] Appl. No.: 135,459

[22] Filed: Dec. 21, 1987

[30] Foreign Application Priority Data

Dec. 19, 1986 [DE] Fed. Rep. of Germany ....... 3643556

[51] Int. Cl.⁴ .................................... F02B 75/06
[52] U.S. Cl. ................... 123/192 R; 248/636; 267/140.1
[58] Field of Search .......... 123/192 R, 195 A, 192 B, 123/198 E, 195 R; 267/219, 35, 140.1, 8 R; 180/312; 248/636, 562

[56] References Cited

U.S. PATENT DOCUMENTS

| | | | |
|---|---|---|---|
| 4,537,275 | 8/1985 | Kiunura et al. | 123/192 R |
| 4,671,227 | 6/1987 | Hollorueger et al. | 123/192 R |
| 4,693,217 | 9/1987 | Bcor | 123/192 R |
| 4,699,099 | 10/1987 | Arai et al. | 123/192 R |
| 4,711,206 | 12/1987 | Andrä et al. | 123/192 R |

Primary Examiner—Raymond A. Nelli
Attorney, Agent, or Firm—Herbert L. Lerner; Laurence A. Greenberg

[57] ABSTRACT

A hydraulic-damping engine mount includes a working chamber having a given diameter and a compensating chamber. A rigid intermediate plate is disposed between the chambers. A conical jacket-like rubber-elastic wall has relatively smaller and larger diameter ends. A metal bearing plate is disposed at the smaller diameter end and at least partly defines the working chamber along with the intermediate plate and the wall. The intermediate plate has an overflow opening formed therein interconnecting the chambers. A rigid plate in the form of a circular disk has a diameter smaller than the given diameter. The rigid plate is disposed in the working chamber parallel to the intermediate plate and is rigidly connected to the bearing plate.

7 Claims, 2 Drawing Sheets

HYDRAULIC-DAMPING ENGINE MOUNT

The invention relates to a hydraulic-damping engine mount having a working chamber with a conical jacket-like rubber-elastic wall having a metal bearing plate at the smaller diameter end thereof, the working chamber communicating with a compensating chamber through an overflow opening formed in a rigid intermediate plate defining the other end surface of the working chamber.

An engine mount of this kind is known, for instance from German Published, Non-Prosecuted Application DE-OS No. 32 44 296, corresponding to U.S. Pat. No. 4,657,227. A first essential factor in such an engine mount is the damping of high amplitudes at low frequency, which is generally determined by the size and disposition of the overflow opening and a second factor is the course of the dynamic rigidity, which permits the best possible isolation of acoustic vibrations to be attained. The first factors that determine the course of the dynamic rigidity are the geometry of the mount and the second factors are decoupling diaphragms disposed inside the working chamber, with which high-frequency vibrations of low amplitude can be decoupled. Generally, a lowering of the dynamic rigidity over a certain frequency band is attained. Beyond certain frequencies, a further reduction or maintenance of a low level of the dynamic rigidity can no longer be attained with a decoupling diaphragm of this kind and instead, the rigidity then rises steeply.

It is accordingly an object of the invention to provide a hydraulic-damping engine mount, which overcomes the hereinafore-mentioned disadvantages of the heretofore-known devices of this general type and which permits the dynamic rigidity to be lowered over a further frequency range and kept at a low level.

With the foregoing and other objects in view there is provided, in accordance with the invention, a hydraulic-damping engine mount, comprising a working chamber having a given diameter, a compensating chamber, a rigid intermediate plate disposed between the chambers, a conical jacket-like rubber-elastic wall having relatively smaller and larger diameter ends, a metal bearing plate disposed at the smaller diameter end and at least partly defining the working chamber along with the intermediate plate and the wall, the intermediate plate having an overflow opening formed therein interconnecting the chambers, and a rigid plate in the form of a circular disk having a diameter smaller than the given diameter, the rigid plate being disposed in the working chamber parallel to the intermediate plate and being rigidly connected to the bearing plate.

As a result of this disposition of a second plate vibrating in synchronism with the bearing plate and located inside the working chamber, an annular additional overflow channel of adjustable size is formed between the outer periphery of the second plate and the inner wall of the working chamber, and with this additional overflow channel the dynamic behavior of the mount can be varied, an in particular the dynamic rigidity can be lowered over a further frequency band.

In accordance with another feature of the invention, there is provided a vertical bolt connecting the rigid plate with the bearing plate.

In accordance with a further feature of the invention, there is provided a metal cylindrical peripheral wall also defining the working chamber and having a lower edge with a conical inward taper, means for suspending the peripheral wall from above, the conical jacket-like rubber-elastic wall being in the form of a support spring supported on the conical inward taper and reaching into the working chamber, the bearing plate forming a center of the support spring, the rigid plate being placed directly on the bearing plate and being carried by the smaller diameter end of the support spring, the rigid plate being spaced apart from the peripheral wall forming a gap therebetween having a constant width independent of the deflection of the support spring.

In accordance with an added feature of the invention, the diameter of the rigid plate is at least one-half of the given diameter of the working chamber.

In accordance with a concomitant feature of the invention, the rigid plate has a thickness of between 1/100 and 1/5 of the diameter thereof.

Thus the size of the additionally formed overflow channel can be suitably adjusted in accordance with particular requirements.

Other features which are considered as characteristic for the invention are set forth in the appended claims.

Although the invention is illustrated and described herein as embodied in a hydraulic-damping engine mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
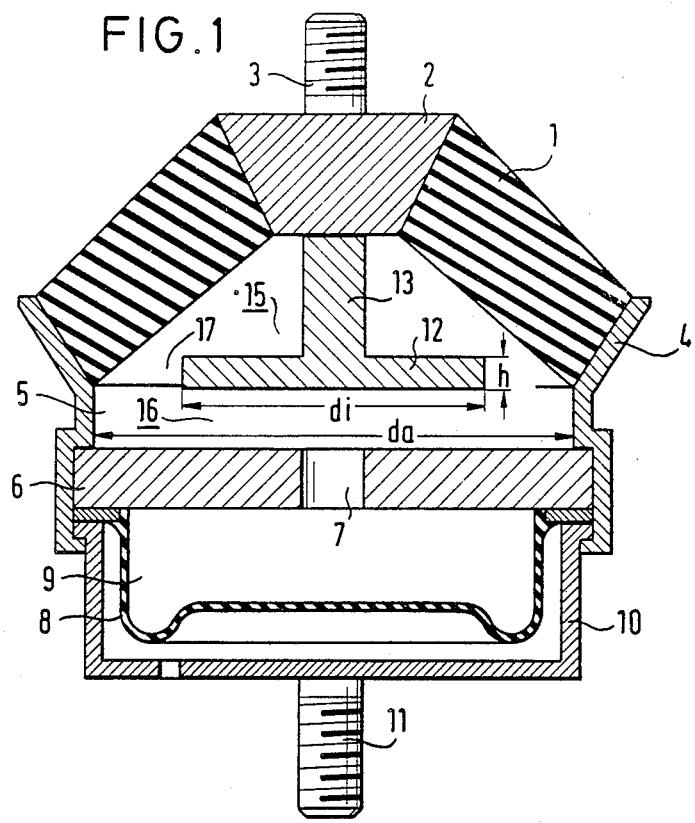
FIG. 1 is a diagrammatic, longitudinal-sectional view of an engine mount having an additional plate experiencing a flow around it.

Referring now to the figures of the drawings in detail and first, particularly, to FIG. 1 thereof, there is seen a hydraulic-damping engine mount which has a conventional conical jacket-like wall 1 made of a rubber-elastic material, that is closed off at the tip thereof by a metal bearing plate 2 with a bolt 3 for securing a non-illustrated engine, and which is vulcanized at the base thereof onto an annular metal flange 4. A working or operating chamber 5 thus formed is closed off at the lower end surface thereof by an intermediate plate 6, which is retained in the metal flange 4 and has a first overflow opening 7. The lower surface of the intermediate plate 6 is adjoined by a compensating chamber 9, which is defined by a flexible bellows 8. The mount can then be firmly screwed to the vehicle body or some equivalent fastening element through a cup-shaped fastening element 10 and a further bolt 11.

A circular-disk-like plate 12 is disposed in the working chamber 5 parallel to the intermediate plate 6 and is rigidly joined to the upper bearing plate 2 by a vertical bolt 13. The plate 12 divides the working chamber 5 into two partial chambers 15 and 16, which communicate with one another through an annular second overflow channel 17 formed between the outer periphery of the plate 12 and the inner wall of the flange 4.

Upon a relative movement of the bearing plate 2 and the circular-disk-like plate 12 with respect to the fastening flange 4 and the intermediate plate 6, the two partial chambers 15 and 16 vary in volume, so that an exchange of fluid takes place between the partial chambers 15 and 16, independently of the exchange taking place through the overflow opening 7.

This fluid movement brings about additional inertial and damping effects in the mount, which determine the dynamic behavior of the mount at changing frequencies.

An essential factor in the dynamic behavior is the geometry of the additional annular overflow channel 17, which is determined by the width and height thereof. It has proved to be particularly advantageous if the diameter $d_i$ of the plate 12 amounts to at least one-half the diameter $d_a$ of the working chamber 5, that is, if $$1 < d_a/d_i \leq 2$$

and if the thickness of the plate amounts to from 1/100 to 1/5 of the diameter thereof, so that the relationship $$5 < d_i/h \leq 100$$

is satisfied.

In addition, the dynamic behavior of the mount can be adapted to specialized uses with a corresponding construction and dimensioning of the overflow opening 7 for suitable adaptation to the geometry of the overflow channel 17.

Figure 2:
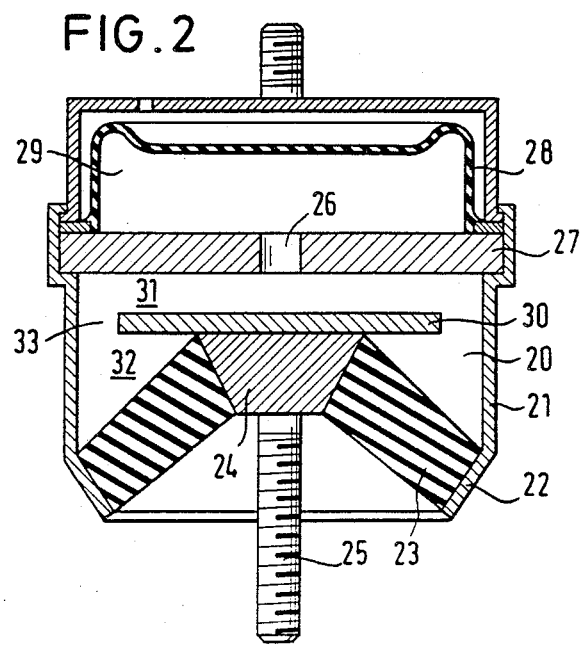
FIG. 2 is a view similar to FIG. 1 of an engine mount functioning in the same manner, in a suspended configuration.

In the embodiment illustrated in FIG. 2, a hydraulic-damping engine mount of this kind is shown in a suspended configuration. For this purpose, a working chamber 20 is surrounded by an initially cylindrically constructed fastening flange 21. The base of a conical jacket-like supporting spring 23 is supported on a lower taper or inwardly drawn-in end 22 of the fastening flange 21 and thus protrudes into the working chamber 20. The conical tip of the support spring 23 is likewise closed off by an engine mount plate 24, on which the engine to be supported is suspended by a bolt 25. The working chamber 20 communicates with a compensating chamber 29 which is surrounded by a flexible bellows 28, through a first overflow opening 26 in an intermediate plate 27.

With this type of construction of the engine mount, a circular-disk-like plate 30 can be secured directly on the bearing plate 24. Once again, partial chambers 31 and 32 which are produced above and below the plate 30, communicate with one another through an annular second overflow opening 33 at the outer periphery of the plate 30.

The operation of a mount constructed according to FIG. 1 is the same as described in connection with FIG. 1.

Figure 3:
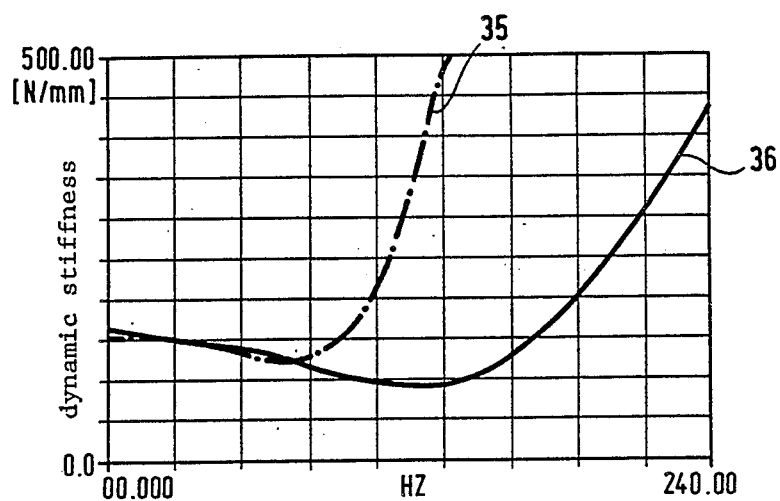
FIG. 3 is a graph relating to the course of the dynamic rigidity.

Finally, the course of the dynamic stiffness or rigidity is shown in the diagram of FIG. 3. In FIG. 3, the dynamic stiffness is plotted in N/mm against the frequency in Hz. The course of the dynamic stiffness of a conventional hydraulic-damping engine mount, such as one having a decoupling diaphragm, is represented by the dot-dash curve 35, while the course of the dynamic stiffness of a mount according to the invention is represented by the solid-line curve 36. It is apparent from the diagram that by providing the second overflow channel and the corresponding fluid movements inside the working chamber, the increase in dynamic stiffness is shifted to a higher frequency, and at the same time the dynamic stiffness value continues to drop until a higher frequency, thus enabling better acoustic decoupling.

However, it is also possible to place separate decoupling diaphragms in the intermediate plate, for instance, in the conventional manner.

The foregoing is a description corresponding in substance to German Application No. P 36 43 556.2, dated Dec. 19, 1986, the International priority of which is being claimed for the instant application, and which is hereby made part of this application. Any material discrepancies between the foregoing specification and the aforementioned corresponding German application are to be resolved in favor of the latter.

We claim:

1. Hydraulic-damping engine mount, comprising a working chamber having a given diameter, a compensating chamber, a rigid intermediate plate disposed between said chambers, a conical jacket-like rubber-elastic wall having relatively smaller and larger diameter ends, a metal bearing plate disposed at said smaller diameter end and at least partly defining said working chamber along with said intermediate plate and said wall, said intermediate plate having an overflow opening formed therein interconnecting said chambers, and a rigid plate in the form of a circular disk having a diameter smaller than said given diameter, said rigid plate being disposed in said working chamber parallel to said intermediate plate and being rigidly connected to said bearing plate.

2. Hydraulic-damping engine mount according to claim 1, including a vertical bolt connecting said rigid plate with said bearing plate.

3. Hydraulic-damping engine mount according to claim 1, including a metal cylindrical peripheral wall also defining said working chamber and having a lower edge with a conical inward taper, means for suspending said peripheral wall from above, said conical jacket-like rubber-elastic wall being in the form of a support spring supported on said conical inward taper and reaching into said working chamber, said bearing plate forming a center of said support spring, said rigid plate being placed directly on said bearing plate and being carried by said smaller diameter end of said support spring, said rigid plate being spaced apart from said peripheral wall forming a gap therebetween having a constant width independent of the deflection of said support spring.

4. Hydraulic-damping engine mount according to claim 2, wherein said diameter of said rigid plate is at least one-half of said given diameter of said working chamber.

5. Hydraulic-damping engine mount according to claim 3, wherein said diameter of said rigid plate is at least one-half of said given diameter of said working chamber.

6. Hydraulic-damping engine mount according to claim 4, wherein said rigid plate has a thickness of between 1/100 and 1/5 of said diameter thereof.

7. Hydraulic-damping engine mount according to claim 5, wherein said rigid plate has a thickness of between 1/100 and 1/5 of said diameter thereof.

* * * * *